(12) United States Patent
Nekouzadeh et al.

(10) Patent No.: US 12,485,219 B2
(45) Date of Patent: Dec. 2, 2025

(54) DRUG DELIVERY DEVICES WITH PARTIAL DRUG DELIVERY MEMBER RETRACTION

(71) Applicant: AMGEN INC., Thousand Oaks, CA (US)

(72) Inventors: Ali Nekouzadeh, Simi Valley, CA (US); Carl Conrath, Thousand Oaks, CA (US); Scott Robert Gibson, Simi Valley, CA (US); Basel Hasan Taha, Simi Valley, CA (US)

(73) Assignee: AMGEN INC., Thousand Oaks, CA (US)

( * ) Notice: Subject to any disclaimer, the term of this patent is extended or adjusted under 35 U.S.C. 154(b) by 835 days.

(21) Appl. No.: 17/277,599

(22) PCT Filed: Oct. 14, 2019

(86) PCT No.: PCT/US2019/056073
§ 371 (c)(1),
(2) Date: Mar. 18, 2021

(87) PCT Pub. No.: WO2020/091981
PCT Pub. Date: May 7, 2020

(65) Prior Publication Data
US 2022/0031939 A1 Feb. 3, 2022

Related U.S. Application Data

(60) Provisional application No. 62/754,412, filed on Nov. 1, 2018.

(51) Int. Cl.
*A61M 5/145* (2006.01)
*A61M 5/158* (2006.01)

(52) U.S. Cl.
CPC .......... *A61M 5/1452* (2013.01); *A61M 5/158* (2013.01); *A61M 2005/1583* (2013.01);
(Continued)

(58) Field of Classification Search
CPC ................ A61M 5/1452; A61M 5/158; A61M 2005/1583; A61M 2005/1585;
(Continued)

(56) References Cited

U.S. PATENT DOCUMENTS

| 3,316,909 A | 5/1967 | Cowley |
| 3,720,211 A | 3/1973 | Kyrias |

(Continued)

FOREIGN PATENT DOCUMENTS

| CN | 103249443 B | 10/2015 |
| GB | 2550924 A | 12/2017 |

(Continued)

OTHER PUBLICATIONS

International Search Report and Written Opinion for International Patent Application No. PCT/US2019/055010, dated Jan. 20, 2020.
(Continued)

*Primary Examiner* — Kami A Bosworth
*Assistant Examiner* — Avery Smale
(74) *Attorney, Agent, or Firm* — MARSHALL, GERSTEIN & BORUN LLP; Michael P. Furmanek

(57) ABSTRACT

Methods, devices, and components are provided to reduce tissue resistive pressure during a subcutaneous drug delivery operation by increasing the size of the injection cavity by partially retracting the drug delivery member after inserting the drug delivery member to a subcutaneous position. The drug delivery devices described herein include a motor operably coupled to a drug delivery member. The motor can be selectively activated by a controller to retract the drug delivery member a predetermined distance to relieve pressure in an injection cavity in a patient. A force sensor can provide the controller with a drug delivery member insertion force. The controller can then estimate a tissue resistive pressure based on the drug delivery member insertion force
(Continued)

and determine the predetermined distance for the partial drug delivery member retraction based on the tissue resistive pressure.

20 Claims, 2 Drawing Sheets

(52) U.S. Cl.
CPC ............... *A61M 2005/1585* (2013.01); *A61M 2205/332* (2013.01)

(58) Field of Classification Search
CPC ...... A61M 2205/332; A61M 2005/206; A61M 5/3287; A61M 5/48; A61M 5/482; A61M 5/484; A61M 5/486; A61M 5/488
See application file for complete search history.

(56) References Cited

U.S. PATENT DOCUMENTS

| | | | |
|---|---|---|---|
| 3,797,489 | A | 3/1974 | Sarnoff |
| 4,699,612 | A | 10/1987 | Hamacher |
| 6,478,768 | B1 | 11/2002 | Kneer |
| 8,795,230 | B2 | 8/2014 | Schoonmaker et al. |
| 9,814,840 | B2 | 11/2017 | Cowe et al. |
| 9,844,635 | B2 | 12/2017 | Schoonmaker et al. |
| 9,849,252 | B2 | 12/2017 | Armes |
| 2010/0076400 | A1 | 3/2010 | Wall |
| 2015/0174326 | A1 | 6/2015 | Bokelman et al. |
| 2016/0128576 | A1 | 5/2016 | Chiang et al. |
| 2016/0256106 | A1 | 9/2016 | Krasnow et al. |
| 2016/0302868 | A1 | 10/2016 | Nagale et al. |
| 2017/0157340 | A1* | 6/2017 | Moeller ............... A61M 5/1452 |
| 2017/0216526 | A1 | 8/2017 | Brereton et al. |
| 2018/0021508 | A1* | 1/2018 | Destefano ............ A61M 5/158 604/151 |
| 2018/0236185 | A1* | 8/2018 | Säll ....................... A61M 5/20 |

FOREIGN PATENT DOCUMENTS

| | | |
|---|---|---|
| KR | 101776258 B1 | 9/2017 |
| TW | 201315499 A | 4/2013 |
| WO | WO-2012/045831 A1 | 4/2012 |
| WO | WO-2013028906 A1 | 2/2013 |
| WO | WO-2014/150201 A1 | 9/2014 |
| WO | WO-2015/171777 A1 | 11/2015 |
| WO | WO-2016/003813 A1 | 1/2016 |
| WO | WO-2018/055433 A1 | 3/2018 |
| WO | WO-2018/136398 A1 | 7/2018 |
| WO | WO-2019/081947 A1 | 5/2019 |

OTHER PUBLICATIONS

International Application No. PCT/US2019/057370, International Search Report and Written Opinion, mailed Jan. 27, 2020.
International Application No. PCT/US2019/056073, International Search Report and Written Opinion, mailed Feb. 3, 2020.

* cited by examiner

DRUG DELIVERY DEVICES WITH PARTIAL DRUG DELIVERY MEMBER RETRACTION

CROSS-REFERENCE TO RELATED APPLICATIONS

This is the United States national phase of International Patent Application No. PCT/US19/56073, filed Oct. 14, 2019, which application claims priority to U.S. Provisional Patent Application No. 62/754,412, filed Nov. 1, 2018, the entire contents of each of which are hereby incorporated by reference herein.

FIELD OF DISCLOSURE

The present disclosure generally relates to drug delivery devices and, more particularly, to drug delivery member insertion mechanisms for drug delivery devices.

BACKGROUND

Drugs can be administered through the use of drug delivery devices such as autoinjectors or on-body injectors (also referred to as wearable injectors). Autoinjectors and on-body injectors may be used to help automate the injection and delivery or administration process, thereby simplifying the process for certain patient groups or sub-groups for which use of the syringe/vial combination or pre-filled syringe systems would be disadvantageous, whether because of physiological or psychological impediments.

Subcutaneous injection is one method for a gradual release of drug product into the blood stream and is the injection type in most autoinjector and on-body injector drug delivery devices. The limited amount of blood vessels and fluid paths within the subcutaneous tissue, however, can cause a pressure build up at the point of injection. This pressure can resist the injection, can cause significant variability in the injection time, and may cause pain for the patients.

SUMMARY

In accordance with a first aspect, a drug delivery device is disclosed that includes a primary container assembly with a reservoir, a plunger stopper disposed within the reservoir, and a drug delivery member that is fluidly coupled to the reservoir by a flow path. The drug delivery device further includes a motor that is configured to insert the drug delivery member to a subcutaneous location and a drug dispensing assembly with a plunger rod and a drive operably coupled to the plunger rod to drive the plunger stopper through the reservoir with the plunger rod in a drug dispensing operation. A force sensor is coupled to the drug dispensing assembly and is configured to measure force data associated with dispensing a drug from the reservoir through the drug delivery member to an injection cavity at the subcutaneous location. A controller of the drug delivery device is in communication with the force sensor and the motor and is configured to operate the motor to partially retract the drug delivery member in response to determining that the force data indicates a force greater than or equal to a predetermined threshold.

According to some versions, the drug delivery device can include one or more of the following aspects: the force sensor can be disposed between the plunger rod and the plunger stopper; the controller can be configured to continuously monitor the force data and control the motor according to the force data to control an onset, rate, and extent of retraction of the drug delivery member to maintain a desired tissue resistive pressure in the injection cavity; the controller can be in communication with the drive of the drug dispensing assembly and configured to control operation of the drive and motor to maintain a desired drug dispensing force; the motor can be the drive of the drug dispensing assembly; the drug delivery member can include a cannula coaxial with a trocar and fluidly coupled to the reservoir by the flow path where components of the primary container assembly and drug dispensing assembly can be disposed in a generally horizontal plane and the trocar and cannula can extend along an axis generally perpendicular to the horizontal plane, the motor can be operably configured to insert the cannula and trocar to the subcutaneous location and the controller can be configured to operate the motor to partially retract the cannula in response to determining that the force data indicates a force greater than or equal to a predetermined threshold; the controller can be configured to operate the motor to fully retract the trocar and partially retract the cannula after inserting the cannula and trocar to the subcutaneous location; components of the primary container assembly and drug dispensing assembly can be disposed along a longitudinal axis and the flow path can be a hub rigidly coupling the drug delivery member to the reservoir; or the controller can be configured to operate the motor to retract the drug delivery member after inserting the drug delivery member to the subcutaneous location. In some embodiments, the drug delivery member can be a hypodermic needle that is fluidly coupled to the reservoir by the flow path. The motor can be operably configured to insert the hypodermic needle to the subcutaneous location and the controller can be configured to operate the motor to partially retract the hypodermic needle in response to determining that the force data indicates a force greater than or equal to a predetermined threshold, or at some time after the insertion of the hypodermic needle.

In accordance with a second aspect, a method for operating a drug delivery device is described that includes operating a motor operably coupled to a drug delivery member with a controller to insert the drug delivery member to a subcutaneous location, operating a drive with the controller to drive a plunger stopper through a reservoir with a plunger rod, measuring force data associated with dispensing a drug from the reservoir through the drug delivery member to an injection cavity at the subcutaneous location with a force sensor coupled to a drug dispensing assembly, determining with the controller whether the force data indicates a force greater than or equal to a predetermined threshold, and operating the motor with the controller to partially retract the drug delivery member in response to determining that the force data indicates that a force greater than or equal to the predetermined threshold.

According to some versions, the method can include one or more of the following aspects: measuring the force data can include measuring force data with a force sensor disposed between the plunger rod and the plunger stopper; the method can include continuously monitoring the force data with the controller and controlling the motor with the controller based on the force data to control an onset, rate, and extent of retraction of the drug delivery member to maintain a desired tissue resistive pressure in the injection cavity; operating the drive to drive the plunger stopper through the reservoir with the plunger rod can include operating the motor; operating the motor to insert the drug delivery member to the subcutaneous location can include operating the motor to simultaneously insert a cannula disposed coaxially over a trocar to the subcutaneous location and operating the motor to partially retract the cannula in response to determining that the force data indicates that a force greater than or equal to the predetermined threshold; the flow path can be a hub rigidly coupling the drug delivery member to the reservoir, and operating the motor operably coupled to the drug delivery member to insert the drug delivery member to the subcutaneous location can include operating the motor to drive the reservoir to insert the drug delivery member to the subcutaneous location; the method can include operating the motor to fully retract the trocar and partially retract the cannula after inserting the cannula and trocar to the subcutaneous location; or the method can include operating the motor with the controller to retract the drug delivery member after inserting the drug delivery member to the subcutaneous location.

In accordance with a third aspect, a drug delivery device is disclosed that includes a housing having an interior and a primary container assembly at least partially received within the interior of the housing. The primary container assembly includes a reservoir having a sidewall defining an interior, a plunger stopper disposed within the interior of the reservoir, and a drug delivery member fluidly coupled to the reservoir by a flow path, where at least the drug delivery member is movable from a stored position to an inserted position in a subcutaneous location. The drug delivery device further includes an insertion drive operably coupled to the drug delivery member, a retraction drive operably coupled to the drug delivery member, and a drug dispensing assembly including a plunger rod and a dispensing drive operably coupled to the plunger rod. A controller of the drug delivery device is in communication with the insertion, dispensing, and retraction drives and is configured to: operate the insertion drive to insert the drug delivery member to the subcutaneous location, operate the dispensing drive to drive the plunger stopper through the reservoir with the plunger rod, and operate the retraction drive to partially retract the drug delivery member from the inserted position to a partially retracted position in response to an event.

According to some versions, the controller can be configured to operate the retraction drive to partially retract the drug delivery member from the inserted position to the partially retracted position after a predetermined delay time has passed after at least one of: reception of a user input actuation signal, operation of the insertion drive to insert the drug delivery member to the subcutaneous location, or at the start of operation of the dispensing drive to drive the plunger stopper through the reservoir with the plunger rod.

According to some versions, the controller can be configured to operate the retraction drive to partially retract the drug delivery member from the inserted position to the partially retracted position in response to a signal from an actuator or a sensor.

BRIEF DESCRIPTION OF THE DRAWINGS

The above needs are at least partially met through provision of the embodiments described in the following detailed description, particularly when studied in conjunction with the drawings, wherein.

DETAILED DESCRIPTION

Methods, devices, and components are provided to reduce tissue resistive pressure during a subcutaneous drug delivery operation by increasing the size of the injection cavity by partially retracting a drug delivery member (e.g., a rigid needle or soft cannula) after inserting the drug delivery member to a subcutaneous position. An injection cavity refers to the cavity at the tip of the drug delivery member inside the patient tissue. The drug delivery devices described herein include a motor operably coupled to a drug delivery member. The motor can be selectively activated by a controller to retract the drug delivery member a predetermined distance to relieve pressure in an injection cavity in a patient. A force sensor can provide the controller with a drug delivery member insertion force. The controller can then estimate a tissue resistive pressure based on the drug delivery member insertion force and determine the predetermined distance for the drug delivery member retraction based on the tissue resistive pressure.

Figure 1:
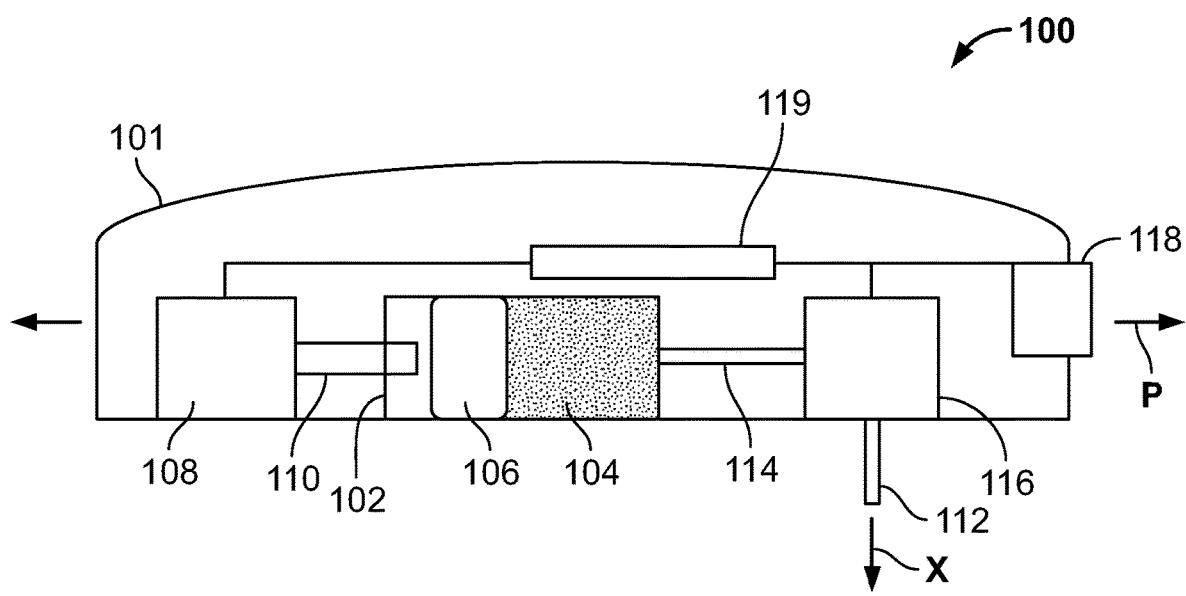
FIG. 1 is a diagrammatic view of an on-body drug delivery device in accordance with various embodiments.

In some versions, as illustrated in FIG. 1, drug delivery devices 100, such as on body injectors, can have a horizontally oriented configuration with drug delivery components disposed generally along a horizontal plane P within a low profile housing 101 of the devices 100. The drug delivery components can include a reservoir 102 having a drug 104 contained therein, a plunger stopper 106 disposed within the reservoir 102 and sildably movable therein along the horizontal plane P, a drive mechanism 108 coupled to a plunger rod 110 to drive the plunger stopper 106 through the reservoir 102, a trocar 112 and a drug delivery member 113 which in the depicted version can include a cannula such as a soft or flexible cannula oriented along an axis X that extends generally perpendicular to the horizontal plane P, a flow path 114 fluidly coupling the reservoir 102 to the trocar 112 and drug delivery member 113, and an insertion mechanism 116 configured to insert the trocar 112 and drug delivery member 113 to a subcutaneous injection region within the user. Thereafter, the insertion mechanism 116 can fully retract the trocar 112 to leave the drug delivery member 113 within the patient at the subcutaneous injection region. In some versions the trocar 112 can include a hollow trocar through which drug passes before passing through the cannula and into the patient. In other versions, the trocar 112 can include a solid trocar which must be removed from the fluid flow path between the reservoir and the cannula prior to drug delivery.

Figure 2:
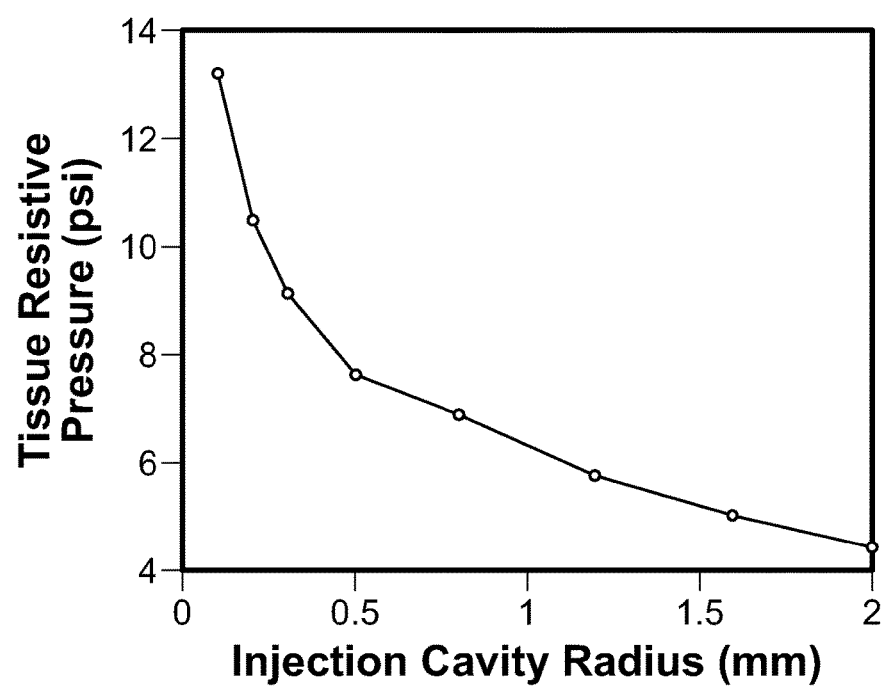
FIG. 2 is a graph showing simulation results for the variation of steady state tissue resistive pressure as a function of the injection cavity radius.

As commonly configured, one or more of the components of the device 100, such as the drive mechanism 108 and insertion mechanism 116, can be operable in response to actuation of a user input device 118 accessible on an exterior of the housing 101. Suitable drive/insertion mechanisms include, but are not limited to, springs, gas sources, phase changing materials, motors, magnetic actuators, or other electromechanical systems. The device 100 can also include electronic components, such as a controller 119, to control operation of one or more of the drug delivery components. As used herein, a controller will be understood to include a processor and a memory storing logic that is executable by the processor. More specifically, the memory may include one or more tangible non-transitory readable memories having logic (e.g., executable instructions) stored thereon, which instructions when executed by the processor may cause the at least one processor to carry out the actions that the controller is adapted to perform. Additionally, the controller may include other circuitry for carrying out certain actions in accordance with the principles of the present disclosure. Example on body injector devices are described in U.S. Ser. No. 62/536,911, filed Jul. 25, 2017, which is hereby incorporated by reference herein It has been found through simulations based on a developed de novo model of the flow of drug product within the subcutaneous tissue, that the magnitude of the tissue resistive pressure, in addition to drug product viscosity and injection rate, depends on the volume of the injection cavity at the point of injection. Simulation results for the variation of the steady state tissue resistive pressure as a function of the injection cavity radius is shown in FIG. 2. The simulation utilized a drug product viscosity of 10 cP and an injection rate of 6.0 mL/min. The horizontal axis is the diameter of the injection cavity in mm and the vertical axis is the tissue resistive pressure in psi. Partial retraction of the drug delivery member increases the size of the injection cavity, and as demonstrated by simulation results, increasing the size of the injection cavity reduces the tissue resistive pressure against the injection.

Figure 3:
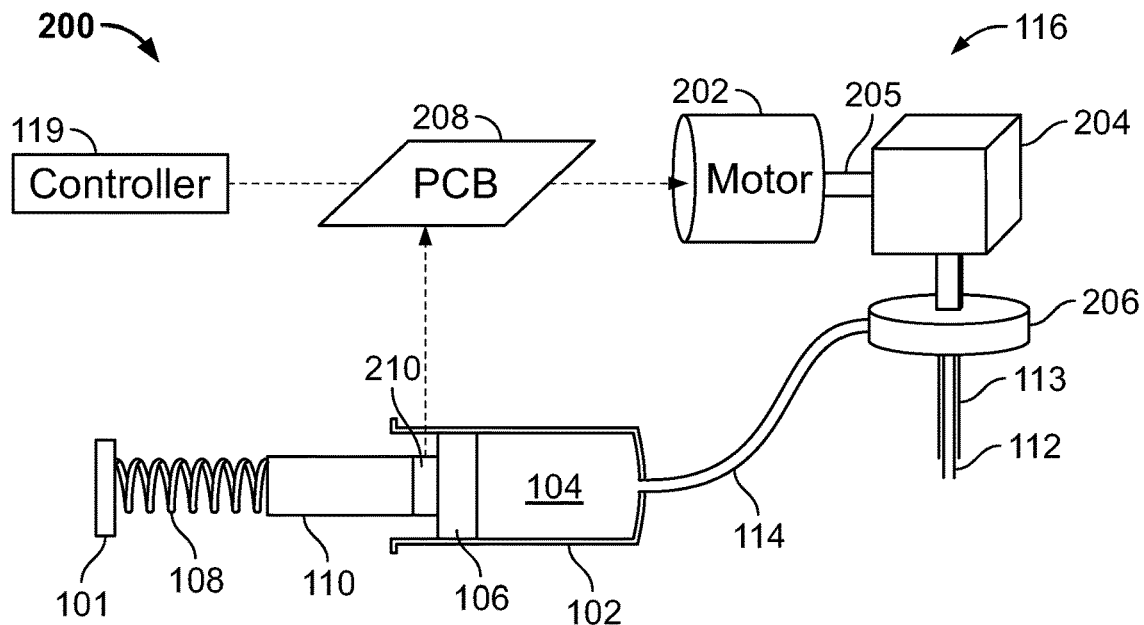
FIG. 3 is a diagrammatic view of an example drug delivery device with retraction capability in accordance with various embodiments.

An example assembly 200 for implementing a partial retraction to reduce the tissue resistive pressure within a patient is shown in FIG. 3 with a retraction drive. The assembly 200 is shown in a diagrammatic form for simplicity and ease of showing interacting components configured to cause the partial retraction. As shown, similar to the above form, each assembly 200 includes a reservoir 102 containing a drug 104, a plunger stopper 106 disposed within the reservoir 102, a drive mechanism 108, a plunger rod/piston 110, and a flow path 114 fluidly coupling the reservoir 102 to a trocar 112 and a drug delivery member 113. In this form, the insertion mechanism 116 includes a motor 202 and a coupler 204, such as a scotch yoke mechanism. The motor 202 drives operation of the coupler 204 to move the trocar and cannula 112, 113 along the x axis to a subcutaneous position within a patient. For example, the coupler 204 can transfer the rotational movement of an output shaft 205 of the motor 202 to a linear translation of the trocar 112 and drug delivery member 113, which can be coupled to one or more hubs 206. The assembly 202 can further include a circuit board 208 in communication between a force sensor 210 disposed between the plunger rod 110 and the plunger stopper 106 and the motor 202.

As discussed above, when a user actuates the user input 118, the controller 119 operates the motor 202 to drive the trocar 112 and drug delivery member 113 to a subcutaneous injection region within a patient. After the insertion operation, in a first retraction operation, the controller 119 can operate the motor 202 to fully retract the trocar 112, thereby leaving only the drug delivery member 113 in the subcutaneous tissue. Then, the controller 119 can operate the motor 202 to partially retract the drug delivery member 113, while maintaining the drug delivery member 113 at a suitable drug delivery depth in the subcutaneous tissue, but reducing tissue resistive pressure in the injection cavity due to the initial insertion. Although the same drive is shown performing the insertion and retraction operations, a separate retraction drive, having any of the above forms, can be operably coupled to one or more of the trocar 112 and drug delivery member 113. The partial retraction operation can be performed automatically by the controller 119. In another approach, the retraction operation can be performed in response to reception of a signal in response to a sensed event. The signal can be provided by the user input 118 in response to a user actuation to relieve pressure in the injection cavity, or by a sensor coupled to one or more components of the device 100. For example, the sensor can be a pressure sensor coupled to the flow path 114, a force sensor coupled to a drive, an optical or capacitance sensor to ensure proper location of the device 100 on the patient, an accelerometer to ensure proper orientation of the device 100, and so forth. In an alternative approach, the controller 119 can operate after a predetermined delay from an event. In some examples, the event can be the initial actuation or subsequent actuation of the user input 118, the insertion mechanism 116 starting or finishing the insertion operation, or the drive mechanism 108 starting the drug dispensing operation.

Thereafter, the controller 119 can operate the drive mechanism 108 or cause the drive mechanism 108 to be released to drive movement of the plunger 110 and plunger stopper 106 to thereby dispense the drug 104 through the drug delivery member 113. The controller 119 is in communication with the force sensor 210 to receive data regarding the force required to push the plunger stopper 106 through the reservoir 102 to dispense the drug 104 into the injection cavity. In some versions, the controller 119 can estimate a tissue resistive pressure based on the injection force and determine the distance for the retraction based on the estimated tissue resistive pressure.

Advantageously, if desired, the controller 119 can monitor the force data for a predetermined threshold corresponding to an undesirable tissue resistive pressure within the injection cavity. In response to determining that the force data indicates that the tissue resistive pressure is equal to or greater than the predetermined threshold, the control 119 can operate the motor 202 to partially retract the drug delivery member 113 to thereby reduce the tissue resistive pressure in the injection cavity. The force feedback can be a dynamic feedback loop, such that the controller 119 can continuously monitor the force and control the onset, rate, and/or extent of the retraction to maintain a desired tissue resistive pressure in the injection cavity. While the foregoing on-body drug delivery device 100 has been described as including a drug delivery member 113, which is a soft or flexible cannula, and a trocar 112 for inserting the drug delivery member 113, other versions of on-body drug delivery devices in accordance with the present disclosure can include a drug delivery member that is a rigid hollow cannula or rigid hollow needle such that no trocar is required for insertion.

Figure 4:
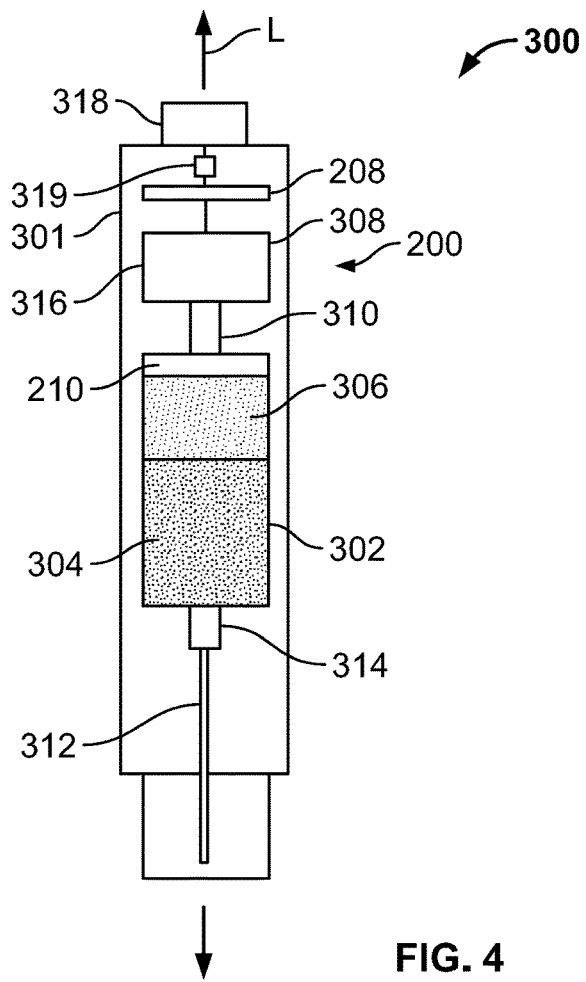
FIG. 4 is a diagrammatic view of an autoinjector drug delivery device in accordance with various embodiments.

In other versions as illustrated in FIG. 4, autoinjector drug delivery devices 300 can have a vertically oriented configuration with some or all drug delivery components disposed in stacked relation along a longitudinal axis L within a housing 301 of the devices 300. More specifically, the devices 300 can be configured to operate and inject a user with the device 300 oriented generally perpendicular to a skin surface of the user. The drug delivery components can include a primary container assembly with a reservoir 302 having a drug 304 contained therein, a plunger stopper 306 disposed within the reservoir 302 and sildably movable therein along the longitudinal axis L, a drug delivery member 312 oriented along the longitudinal axis L, and a flow path or hub 314 fluidly coupling the reservoir 302 to the drug delivery member 312. In some versions, the drug delivery member 312 of the autoinjector 300 of FIG. 4 include a rigid hollow needle or other suitable structure. The drug delivery components further include a drive mechanism 308, such as a spring, a gas source, phase changing materials, a motor, a magnetic actuator, or other electromechanical system, coupled to a plunger rod 310 to drive the plunger stopper 306 through the reservoir 302 and a needle insertion mechanism 316 configured to insert the drug delivery member 312 to a desired subcutaneous depth within the user. The needle insertion mechanism 316 can be coupled to any one of the primary container assembly components and/or the drug delivery member 312 itself.

By some approaches, the needle insertion mechanism 316 can be a drive mechanism to longitudinally move the drug delivery member 312 a desired distance. One suitable drive mechanism is an electric motor. Pursuant to this, the device 100 can include electronic components, such as a controller 319, to control operation of one or more of the drug delivery components. Example autoinjector devices are described in U.S. Ser. No. 62/447,174, filed Jan. 17, 2017, which is hereby incorporated by reference herein. If desired, the drive mechanisms 308, 316 can be a single mechanism configured to drive both movement of the plunger stopper 306 and the drug delivery member 312 by moving some or all of the primary container assembly including the reservoir 302, hub 314, and drug delivery member 312. As commonly configured, one or more of the components of the device 300, such as the drive mechanism 308 and needle insertion mechanism 316, can be operable in response to actuation of a user input device 318 accessible on an exterior of the housing 301.

The above described retraction assembly 200 can also be utilized in these autoinjector devices 300. As shown in FIG. 4, the drug delivery device can include the force sensor 210 disposed between the plunger 310 and the plunger stopper 306, where the controller 319 is in communication with the force sensor 210 and motor(s) 308, 316 through the circuit board 208. Similar to the above form, when a user actuates the user input 318, the controller 319 operates the motor 316 to drive the drug delivery member 312 to a subcutaneous injection region within a patient. After the insertion operation, in a first retraction operation, the controller 319 can operate the motor 316 to partially retract the drug delivery member 312 to reduce tissue resistive pressure in the injection cavity due to the initial insertion. The partial retraction operation can be performed automatically by the controller 319 or in response to a signal, such as from the user input 318.

Thereafter, the controller 319 can operate the drive mechanism 308 or cause the drive mechanism 308 to be released to drive movement of the plunger rod 310 and plunger stopper 306 to thereby dispense the drug 304 through the drug delivery member 312. The controller 319 is in communication with the force sensor 210 to receive data regarding the force required to push the plunger stopper 306 through the reservoir 302 to dispense the drug 304 into the injection cavity. In some versions, the controller 319 can estimate a tissue resistive pressure based on the insertion force and determine a predetermined distance for the retraction based on the tissue resistive pressure.

Advantageously, if desired, the controller 319 can monitor the force data for a predetermined threshold corresponding to an undesirable tissue resistive pressure within the injection cavity. In response to determining that the force data indicates that the tissue resistive pressure is equal to or greater than the predetermined threshold, the control 319 can operate the motor 316 to partially retract the drug delivery member 312 to thereby reduce the tissue resistive pressure in the injection cavity. The force feedback can be a dynamic feedback loop, such that the controller 319 can continuously monitor the force and control the onset, rate, and/or extent of the retraction to maintain a desired tissue resistive pressure in the injection cavity.

The above description describes various assemblies, devices, and methods for use with a drug delivery device. It should be clear that the assemblies, drug delivery devices, or methods can further comprise use of a medicament listed below with the caveat that the following list should neither be considered to be all inclusive nor limiting. The medicament will be contained in a reservoir. In some instances, the reservoir is part of a primary container that is either filled or pre-filled for treatment with the medicament. The primary container can be a cartridge or a pre-filled syringe in some instances.

For example, the drug delivery device or more specifically the reservoir of the device may be filled with colony stimulating factors, such as granulocyte colony-stimulating factor (G-CSF). Such G-CSF agents include, but are not limited to, Neupogen® (filgrastim) and Neulasta® (pegfilgrastim). In various other embodiments, the drug delivery device may be used with various pharmaceutical products, such as an erythropoiesis stimulating agent (ESA), which may be in a liquid or a lyophilized form. An ESA is any molecule that stimulates erythropoiesis, such as Epogen® (epoetin alfa), Aranesp® (darbepoetin alfa), Dynepo® (epoetin delta), Mircera® (methyoxy polyethylene glycol-epoetin beta), Hematide®, MRK-2578, INS-22, Retacrit® (epoetin zeta), Neorecormon® (epoetin beta), Silapo® (epoetin zeta), Binocrit® (epoetin alfa), epoetin alfa Hexal, Abseamed® (epoetin alfa), Ratioepo® (epoetin theta), Eporatio® (epoetin theta), Biopoin® (epoetin theta), epoetin alfa, epoetin beta, epoetin zeta, epoetin theta, and epoetin delta, as well as the molecules or variants or analogs thereof as disclosed in the following patents or patent applications, each of which is herein incorporated by reference in its entirety: U.S. Pat. Nos. 4,703,008; 5,441,868; 5,547,933; 5,618,698; 5,621,080; 5,756,349; 5,767,078; 5,773,569; 5,955,422; 5,986,047; 6,583,272; 7,084,245; and 7,271,689; and PCT Publication Nos. WO 91/05867; WO 95/05465; WO 96/40772; WO 00/24893; WO 01/81405; and WO 2007/136752.

An ESA can be an erythropoiesis stimulating protein. As used herein, "erythropoiesis stimulating protein" means any protein that directly or indirectly causes activation of the erythropoietin receptor, for example, by binding to and causing dimerization of the receptor. Erythropoiesis stimulating proteins include erythropoietin and variants, analogs, or derivatives thereof that bind to and activate erythropoietin receptor; antibodies that bind to erythropoietin receptor and activate the receptor; or peptides that bind to and activate erythropoietin receptor. Erythropoiesis stimulating proteins include, but are not limited to, epoetin alfa, epoetin beta, epoetin delta, epoetin omega, epoetin iota, epoetin zeta, and analogs thereof, pegylated erythropoietin, carbamylated erythropoietin, mimetic peptides (including EMP1/hematide), and mimetic antibodies. Exemplary erythropoiesis stimulating proteins include erythropoietin, darbepoetin, erythropoietin agonist variants, and peptides or antibodies that bind and activate erythropoietin receptor (and include compounds reported in U.S. Publication Nos. 2003/0215444 and 2006/0040858, the disclosures of each of which is incorporated herein by reference in its entirety) as well as erythropoietin molecules or variants or analogs thereof as disclosed in the following patents or patent applications, which are each herein incorporated by reference in its entirety: U.S. Pat. Nos. 4,703,008; 5,441,868; 5,547,933; 5,618,698; 5,621,080; 5,756,349; 5,767,078; 5,773,569;

5,955,422; 5,830,851; 5,856,298; 5,986,047; 6,030,086; 6,310,078; 6,391,633; 6,583,272; 6,586,398; 6,900,292; 6,750,369; 7,030,226; 7,084,245; and 7,217,689; U.S. Publication Nos. 2002/0155998; 2003/0077753; 2003/0082749; 2003/0143202; 2004/0009902; 2004/0071694; 2004/0091961; 2004/0143857; 2004/0157293; 2004/0175379; 2004/0175824; 2004/0229318; 2004/0248815; 2004/0266690; 2005/0019914; 2005/0026834; 2005/0096461; 2005/0107297; 2005/0107591; 2005/0124045; 2005/0124564; 2005/0137329; 2005/0142642; 2005/0143292; 2005/0153879; 2005/0158822; 2005/0158832; 2005/0170457; 2005/0181359; 2005/0181482; 2005/0192211; 2005/0202538; 2005/0227289; 2005/0244409; 2006/0088906; and 2006/0111279; and PCT Publication Nos. WO 91/05867; WO 95/05465; WO 99/66054; WO 00/24893; WO 01/81405; WO 00/61637; WO 01/36489; WO 02/014356; WO 02/19963; WO 02/20034; WO 02/49673; WO 02/085940; WO 03/029291; WO 2003/055526; WO 2003/084477; WO 2003/094858; WO 2004/002417; WO 2004/002424; WO 2004/009627; WO 2004/024761; WO 2004/033651; WO 2004/035603; WO 2004/043382; WO 2004/101600; WO 2004/101606; WO 2004/101611; WO 2004/106373; WO 2004/018667; WO 2005/001025; WO 2005/001136; WO 2005/021579; WO 2005/025606; WO 2005/032460; WO 2005/051327; WO 2005/063808; WO 2005/063809; WO 2005/070451; WO 2005/081687; WO 2005/084711; WO 2005/103076; WO 2005/100403; WO 2005/092369; WO 2006/50959; WO 2006/02646; and WO 2006/29094.

Examples of other pharmaceutical products for use with the device may include, but are not limited to, antibodies such as Vectibix® (panitumumab), Xgeva™ (denosumab) and Prolia™ (denosamab); other biological agents such as Enbrel® (etanercept, TNF-receptor/Fc fusion protein, TNF blocker), Neulasta® (pegfilgrastim, pegylated filgastrim, pegylated G-CSF, pegylated hu-Met-G-CSF), Neupogen® (filgrastim, G-CSF, hu-MetG-CSF), and Nplate® (romiplostim); small molecule drugs such as Sensipar® (cinacalcet). The device may also be used with a therapeutic antibody, a polypeptide, a protein or other chemical, such as an iron, for example, ferumoxytol, iron dextrans, ferric glyconate, and iron sucrose. The pharmaceutical product may be in liquid form, or reconstituted from lyophilized form.

Among particular illustrative proteins are the specific proteins set forth below, including fusions, fragments, analogs, variants or derivatives thereof:

OPGL specific antibodies, peptibodies, and related proteins, and the like (also referred to as RANKL specific antibodies, peptibodies and the like), including fully humanized and human OPGL specific antibodies, particularly fully humanized monoclonal antibodies, including but not limited to the antibodies described in PCT Publication No. WO 03/002713, which is incorporated herein in its entirety as to OPGL specific antibodies and antibody related proteins, particularly those having the sequences set forth therein, particularly, but not limited to, those denoted therein: 9H7; 18B2; 2D8; 2E11; 16E1; and 22B3, including the OPGL specific antibodies having either the light chain of sequence identification number 2 as set forth therein in FIG. 2 and/or the heavy chain of sequence identification number 4, as set forth therein in FIG. 4, each of which is individually and specifically incorporated by reference herein in its entirety fully as disclosed in the foregoing publication;

Myostatin binding proteins, peptibodies, and related proteins, and the like, including myostatin specific peptibodies, particularly those described in U.S. Publication No. 2004/0181033 and PCT Publication No. WO 2004/058988, which are incorporated by reference herein in their entirety particularly in parts pertinent to myostatin specific peptibodies, including but not limited to peptibodies of the mTN8-19 family, including those of sequence identification numbers 305-351, including TN8-19-1 through TN8-19-40, TN8-19 con1 and TN8-19 con2; peptibodies of the mL2 family of sequence identification numbers 357-383; the mL15 family of sequence identification numbers 384-409; the mL17 family of sequence identification numbers 410-438; the mL20 family of sequence identification numbers 439-446; the mL21 family of sequence identification numbers 447-452; the mL24 family of sequence identification numbers 453-454; and those of sequence identification numbers 615-631, each of which is individually and specifically incorporated by reference herein in their entirety fully as disclosed in the foregoing publication;

IL-4 receptor specific antibodies, peptibodies, and related proteins, and the like, particularly those that inhibit activities mediated by binding of IL-4 and/or IL-13 to the receptor, including those described in PCT Publication No. WO 2005/047331 or PCT Application No. PCT/US2004/37242 and in U.S. Publication No. 2005/112694, which are incorporated herein by reference in their entirety particularly in parts pertinent to IL-4 receptor specific antibodies, particularly such antibodies as are described therein, particularly, and without limitation, those designated therein: L1H1; L1H2; L1H3; L1H4; L1H5; L1H6; L1H7; L1H8; L1H9; L1H10; L1H11; L2H1; L2H2; L2H3; L2H4; L2H5; L2H6; L2H7; L2H8; L2H9; L2H10; L2H11; L2H12; L2H13; L2H14; L3H1; L4H1; L5H1; L6H1, each of which is individually and specifically incorporated by reference herein in its entirety fully as disclosed in the foregoing publication;

Interleukin 1-receptor 1 ("IL1-R1") specific antibodies, peptibodies, and related proteins, and the like, including but not limited to those described in U.S. Publication No. 2004/097712, which is incorporated herein by reference in its entirety in parts pertinent to IL1-R1 specific binding proteins, monoclonal antibodies in particular, especially, without limitation, those designated therein: 15CA, 26F5, 27F2, 24E12, and 10H7, each of which is individually and specifically incorporated by reference herein in its entirety fully as disclosed in the aforementioned publication;

Ang2 specific antibodies, peptibodies, and related proteins, and the like, including but not limited to those described in PCT Publication No. WO 03/057134 and U.S. Publication No. 2003/0229023, each of which is incorporated herein by reference in its entirety particularly in parts pertinent to Ang2 specific antibodies and peptibodies and the like, especially those of sequences described therein and including but not limited to: L1(N); L1(N) WT; L1(N) 1K WT; 2xL1(N); 2xL1(N) WT; Con4 (N), Con4 (N) 1K WT, 2xCon4 (N) 1K; L1C; L1C 1K; 2xL1C; Con4C; Con4C 1K; 2xCon4C 1K; Con4-L1 (N); Con4-L1C; TN-12-9 (N); C17 (N); TN8-8(N); TN8-14 (N); Con1 (N), also including anti-Ang 2 antibodies and formulations such as those described in PCT Publication No. WO 2003/030833 which is incorporated herein by reference in its entirety as to the same, particularly Ab526; Ab528; Ab531; Ab533; Ab535; Ab536; Ab537; Ab540; Ab543; Ab544; Ab545; Ab546; A551; Ab553; Ab555; Ab558; Ab559; Ab565; AbF1AbFD; AbFE; AbFJ; AbFK; AbG1D4; AbGC1E8; AbH1C12; AbIA1; AbIF; AbIK, AbIP; and AbIP, in their various permutations as described therein, each of which is individually and specifically incorporated by reference herein in its entirety fully as disclosed in the foregoing publication;

NGF specific antibodies, peptibodies, and related proteins, and the like including, in particular, but not limited to those described in U.S. Publication No. 2005/0074821 and U.S. Pat. No. 6,919,426, which are incorporated herein by reference in their entirety particularly as to NGF-specific antibodies and related proteins in this regard, including in particular, but not limited to, the NGF-specific antibodies therein designated 4D4, 4G6, 6H9, 7H2, 14D10 and 14D11, each of which is individually and specifically incorporated by reference herein in its entirety fully as disclosed in the foregoing publication;

CD22 specific antibodies, peptibodies, and related proteins, and the like, such as those described in U.S. Pat. No. 5,789,554, which is incorporated herein by reference in its entirety as to CD22 specific antibodies and related proteins, particularly human CD22 specific antibodies, such as but not limited to humanized and fully human antibodies, including but not limited to humanized and fully human monoclonal antibodies, particularly including but not limited to human CD22 specific IgG antibodies, such as, for instance, a dimer of a human-mouse monoclonal hLL2 gamma-chain disulfide linked to a human-mouse monoclonal hLL2 kappa-chain, including, but limited to, for example, the human CD22 specific fully humanized antibody in Epratuzumab, CAS registry number 501423-23-0;

IGF-1 receptor specific antibodies, peptibodies, and related proteins, and the like, such as those described in PCT Publication No. WO 06/069202, which is incorporated herein by reference in its entirety as to IGF-1 receptor specific antibodies and related proteins, including but not limited to the IGF-1 specific antibodies therein designated L1H1, L2H2, L3H3, L4H4, L5H5, L6H6, L7H7, L8H8, L9H9, L10H10, L11H11, L12H12, L13H13, L14H14, L15H15, L16H16, L17H17, L18H18, L19H19, L20H20, L21H21, L22H22, L23H23, L24H24, L25H25, L26H26, L27H27, L28H28, L29H29, L30H30, L31H31, L32H32, L33H33, L34H34, L35H35, L36H36, L37H37, L38H38, L39H39, L40H40, L41H41, L42H42, L43H43, L44H44, L45H45, L46H46, L47H47, L48H48, L49H49, L50H50, L51H51, L52H52, and IGF-1R-binding fragments and derivatives thereof, each of which is individually and specifically incorporated by reference herein in its entirety fully as disclosed in the foregoing publication;

Also among non-limiting examples of anti-IGF-1R antibodies for use in the methods and compositions of the present invention are each and all of those described in:

(i) U.S. Publication No. 2006/0040358 (published Feb. 23, 2006), 2005/0008642 (published Jan. 13, 2005), 2004/0228859 (published Nov. 18, 2004), including but not limited to, for instance, antibody 1A (DSMZ Deposit No. DSM ACC 2586), antibody 8 (DSMZ Deposit No. DSM ACC 2589), antibody 23 (DSMZ Deposit No. DSM ACC 2588) and antibody 18 as described therein;

(ii) PCT Publication No. WO 06/138729 (published Dec. 28, 2006) and WO 05/016970 (published Feb. 24, 2005), and Lu et al. (2004), J. Biol. Chem. 279:2856-2865, including but not limited to antibodies 2F8, A12, and IMC-A12 as described therein;

(iii) PCT Publication No. WO 07/012614 (published Feb. 1, 2007), WO 07/000328 (published Jan. 4, 2007), WO 06/013472 (published Feb. 9, 2006), WO 05/058967 (published Jun. 30, 2005), and WO 03/059951 (published Jul. 24, 2003);

(iv) U.S. Publication No. 2005/0084906 (published Apr. 21, 2005), including but not limited to antibody 7C10, chimaeric antibody C7C10, antibody h7C10, antibody 7H2M, chimaeric antibody *7C10, antibody GM 607, humanized antibody 7C10 version 1, humanized antibody 7C10 version 2, humanized antibody 7C10 version 3, and antibody 7H2HM, as described therein;

(v) U.S. Publication Nos. 2005/0249728 (published Nov. 10, 2005), 2005/0186203 (published Aug. 25, 2005), 2004/0265307 (published Dec. 30, 2004), and 2003/0235582 (published Dec. 25, 2003) and Maloney et al. (2003), Cancer Res. 63:5073-5083, including but not limited to antibody EM164, resurfaced EM164, humanized EM164, huEM164 v1.0, huEM164 v1.1, huEM164 v1.2, and huEM164 v1.3 as described therein;

(vi) U.S. Pat. No. 7,037,498 (issued May 2, 2006), U.S. Publication Nos. 2005/0244408 (published Nov. 30, 2005) and 2004/0086503 (published May 6, 2004), and Cohen, et al. (2005), Clinical Cancer Res. 11:2063-2073, e.g., antibody CP-751,871, including but not limited to each of the antibodies produced by the hybridomas having the ATCC accession numbers PTA-2792, PTA-2788, PTA-2790, PTA-2791, PTA-2789, PTA-2793, and antibodies 2.12.1, 2.13.2, 2.14.3, 3.1.1, 4.9.2, and 4.17.3, as described therein;

(vii) U.S. Publication Nos. 2005/0136063 (published Jun. 23, 2005) and 2004/0018191 (published Jan. 29, 2004), including but not limited to antibody 19D12 and an antibody comprising a heavy chain encoded by a polynucleotide in plasmid 15H12/19D12 HCA (γ4), deposited at the ATCC under number PTA-5214, and a light chain encoded by a polynucleotide in plasmid 15H12/19D12 LCF (κ), deposited at the ATCC under number PTA-5220, as described therein; and (viii) U.S. Publication No. 2004/0202655 (published Oct. 14, 2004), including but not limited to antibodies PINT-6A1, PINT-7A2, PINT-7A4, PINT-7A5, PINT-7A6, PINT-8A1, PINT-9A2, PINT-11A1, PINT-11A2, PINT-11A3, PINT-11A4, PINT-11A5, PINT-11A7, PINT-11A12, PINT-12A1, PINT-12A2, PINT-12A3, PINT-12A4, and PINT-12A5, as described therein; each and all of which are herein incorporated by reference in their entireties, particularly as to the aforementioned antibodies, peptibodies, and related proteins and the like that target IGF-1 receptors;

B-7 related protein 1 specific antibodies, peptibodies, related proteins and the like ("B7RP-1," also is referred to in the literature as B7H2, ICOSL, B7h, and CD275), particularly B7RP-specific fully human monoclonal IgG2 antibodies, particularly fully human IgG2 monoclonal antibody that binds an epitope in the first immunoglobulin-like domain of B7RP-1, especially those that inhibit the interaction of B7RP-1 with its natural receptor, ICOS, on activated T cells in particular, especially, in all of the foregoing regards, those disclosed in U.S. Publication No. 2008/0166352 and PCT Publication No. WO 07/011941, which are incorporated herein by reference in their entireties as to such antibodies and related proteins, including but not limited to antibodies designated therein as follow: 16H (having light chain variable and heavy chain variable sequences designated therein as, respectively, sequence identification number 1 and sequence identification number 7); 5D (having light chain variable and heavy chain variable sequences designated therein as, respectively, sequence identification number 2 and sequence identification number 9); 2H (having light chain variable and heavy chain variable sequences designated therein as, respectively, sequence identification number 3 and sequence identification number 10); 43H (having light chain variable and heavy chain variable sequences designated therein as, respectively, sequence identification number 6 and sequence identification number 14); 41H (having light chain variable and heavy chain variable sequences designated therein as, respectively, sequence identification number 5 and sequence identification number13); and 15H (having light chain variable and heavy chain variable sequences designated therein as, respectively, sequence identification number 4 and sequence identification number 12), each of which is individually and specifically incorporated by reference herein in its entirety fully as disclosed in the foregoing publication;

IL-15 specific antibodies, peptibodies, and related proteins, and the like, such as, in particular, humanized monoclonal antibodies, particularly antibodies such as those disclosed in U.S. Publication Nos. 2003/0138421; 2003/023586; and 2004/0071702; and U.S. Pat. No. 7,153,507, each of which is incorporated herein by reference in its entirety as to IL-15 specific antibodies and related proteins, including peptibodies, including particularly, for instance, but not limited to, HuMax IL-15 antibodies and related proteins, such as, for instance, 146B7;

IFN gamma specific antibodies, peptibodies, and related proteins and the like, especially human IFN gamma specific antibodies, particularly fully human anti-IFN gamma antibodies, such as, for instance, those described in U.S. Publication No. 2005/0004353, which is incorporated herein by reference in its entirety as to IFN gamma specific antibodies, particularly, for example, the antibodies therein designated 1118; 1118*; 1119; 1121; and 1121*. The entire sequences of the heavy and light chains of each of these antibodies, as well as the sequences of their heavy and light chain variable regions and complementarity determining regions, are each individually and specifically incorporated by reference herein in its entirety fully as disclosed in the foregoing publication and in Thakur et al. (1999), Mol. Immunol. 36:1107-1115. In addition, description of the properties of these antibodies provided in the foregoing publication is also incorporated by reference herein in its entirety. Specific antibodies include those having the heavy chain of sequence identification number 17 and the light chain of sequence identification number 18; those having the heavy chain variable region of sequence identification number 6 and the light chain variable region of sequence identification number 8; those having the heavy chain of sequence identification number 19 and the light chain of sequence identification number 20; those having the heavy chain variable region of sequence identification number 10 and the light chain variable region of sequence identification number 12; those having the heavy chain of sequence identification number 32 and the light chain of sequence identification number 20; those having the heavy chain variable region of sequence identification number 30 and the light chain variable region of sequence identification number 12; those having the heavy chain sequence of sequence identification number 21 and the light chain sequence of sequence identification number 22; those having the heavy chain variable region of sequence identification number 14 and the light chain variable region of sequence identification number 16; those having the heavy chain of sequence identification number 21 and the light chain of sequence identification number 33; and those having the heavy chain variable region of sequence identification number 14 and the light chain variable region of sequence identification number 31, as disclosed in the foregoing publication. A specific antibody contemplated is antibody 1119 as disclosed in the foregoing U.S. publication and having a complete heavy chain of sequence identification number 17 as disclosed therein and having a complete light chain of sequence identification number 18 as disclosed therein;

TALL-1 specific antibodies, peptibodies, and the related proteins, and the like, and other TALL specific binding proteins, such as those described in U.S. Publication Nos. 2003/0195156 and 2006/0135431, each of which is incorporated herein by reference in its entirety as to TALL-1 binding proteins, particularly the molecules of Tables 4 and 5B, each of which is individually and specifically incorporated by reference herein in its entirety fully as disclosed in the foregoing publications;

Parathyroid hormone ("PTH") specific antibodies, peptibodies, and related proteins, and the like, such as those described in U.S. Pat. No. 6,756,480, which is incorporated herein by reference in its entirety, particularly in parts pertinent to proteins that bind PTH;

Thrombopoietin receptor ("TPO-R") specific antibodies, peptibodies, and related proteins, and the like, such as those described in U.S. Pat. No. 6,835,809, which is herein incorporated by reference in its entirety, particularly in parts pertinent to proteins that bind TPO-R;

Hepatocyte growth factor ("HGF") specific antibodies, peptibodies, and related proteins, and the like, including those that target the HGF/SF:cMet axis (HGF/SF: c-Met), such as the fully human monoclonal antibodies that neutralize hepatocyte growth factor/scatter (HGF/SF) described in U.S. Publication No. 2005/0118643 and PCT Publication No. WO 2005/017107, huL2G7 described in U.S. Pat. No. 7,220,410 and OA-5d5 described in U.S. Pat. Nos. 5,686,292 and 6,468,529 and in PCT Publication No. WO 96/38557, each of which is incorporated herein by reference in its entirety, particularly in parts pertinent to proteins that bind HGF;

TRAIL-R2 specific antibodies, peptibodies, related proteins and the like, such as those described in U.S. Pat. No. 7,521,048, which is herein incorporated by reference in its entirety, particularly in parts pertinent to proteins that bind TRAIL-R2;

Activin A specific antibodies, peptibodies, related proteins, and the like, including but not limited to those described in U.S. Publication No. 2009/0234106, which is herein incorporated by reference in its entirety, particularly in parts pertinent to proteins that bind Activin A;

TGF-beta specific antibodies, peptibodies, related proteins, and the like, including but not limited to those described in U.S. Pat. No. 6,803,453 and U.S. Publication No. 2007/0110747, each of which is herein incorporated by reference in its entirety, particularly in parts pertinent to proteins that bind TGF-beta;

Amyloid-beta protein specific antibodies, peptibodies, related proteins, and the like, including but not limited to those described in PCT Publication No. WO 2006/081171, which is herein incorporated by reference in its entirety, particularly in parts pertinent to proteins that bind amyloid-beta proteins. One antibody contemplated is an antibody having a heavy chain variable region comprising sequence identification number 8 and a light chain variable region having sequence identification number 6 as disclosed in the foregoing publication;

c-Kit specific antibodies, peptibodies, related proteins, and the like, including but not limited to those described in U.S. Publication No. 2007/0253951, which is incorporated herein by reference in its entirety, particularly in parts pertinent to proteins that bind c-Kit and/or other stem cell factor receptors;

OX40L specific antibodies, peptibodies, related proteins, and the like, including but not limited to those described in U.S. Publication No. 2006/0002929, which is incorporated herein by reference in its entirety, particularly in parts pertinent to proteins that bind 0X40L and/or other ligands of the 0X40 receptor; and Other exemplary proteins, including Activase® (alteplase, tPA); Aranesp® (darbepoetin alfa); Epogen® (epoetin alfa, or erythropoietin); GLP-1, Avonex® (interferon beta-1a); Bexxar® (tositumomab, anti-CD22 monoclonal antibody); Betaseron® (interferon-beta); Campath® (alemtuzumab, anti-CD52 monoclonal antibody); Dynepo® (epoetin delta); Velcade® (bortezomib); MLN0002 (anti-α4β7 mAb); MLN1202 (anti-CCR2 chemokine receptor mAb); Enbrel® (etanercept, TNF-receptor/Fc fusion protein, TNF blocker); Eprex® (epoetin alfa); Erbitux® (cetuximab, anti-EGFR/HER1/c-ErbB-1); Genotropin® (somatropin, Human Growth Hormone); Herceptin® (trastuzumab, anti-HER2/neu (erbB2) receptor mAb); Humatrope® (somatropin, Human Growth Hormone); Humira® (adalimumab); insulin in solution; Infergen® (interferon alfacon-1); Natrecor® (nesiritide; recombinant human B-type natriuretic peptide (hBNP); Kineret® (anakinra); Leukine® (sargamostim, rhuGM-CSF); LymphoCide® (epratuzumab, anti-CD22 mAb); Benlysta™ (lymphostat B, belimumab, anti-BlyS mAb); Metalyse® (tenecteplase, t-PA analog); Mircera® (methoxy polyethylene glycol-epoetin beta); Mylotarg® (gemtuzumab ozogamicin); Raptiva® (efalizumab); Cimzia® (certolizumab pegol, CDP 870); Soliris™ (eculizumab); pexelizumab (anti-05 complement); Numax® (MEDI-524); Lucentis® (ranibizumab); Panorex® (17-1A, edrecolomab); Trabio® (lerdelimumab); TheraCim hR3 (nimotuzumab); Omnitarg (pertuzumab, 2C4); Osidem® (IDM-1); OvaRex® (B43.13); Nuvion® (visilizumab); cantuzumab mertansine (huC242-DM1); NeoRecormon® (epoetin beta); Neumega® (oprelvekin, human interleukin-11); Neulasta® (pegylated filgrastim, pegylated G-CSF, pegylated hu-Met-G-CSF); Neupogen® (filgrastim, G-CSF, hu-MetG-CSF); Orthoclone OKT3® (muromonab-CD3, anti-CD3 monoclonal antibody); Procrit® (epoetin alfa); Remicade® (infliximab, anti-TNFα monoclonal antibody); Reopro® (abciximab, anti-GP IIb/IIIa receptor monoclonal antibody); Actemra® (anti-IL6 Receptor mAb); Avastin® (bevacizumab), HuMax-CD4 (zanolimumab); Rituxan® (rituximab, anti-CD20 mAb); Tarceva® (erlotinib); Roferon-A®-(interferon alfa-2a); Simulect® (basiliximab); Prexige® (lumiracoxib); Synagis® (palivizumab); 146B7-CHO (anti-IL15 antibody, see U.S. Pat. No. 7,153,507); Tysabri® (natalizumab, anti-a4integrin mAb); Valortim® (MDX-1303, anti-B. anthracis protective antigen mAb); ABthrax™; Vectibix® (panitumumab); Xolair® (omalizumab); ETI211 (anti-MRSA mAb); IL-1 trap (the Fc portion of human IgG1 and the extracellular domains of both IL-1 receptor components (the Type I receptor and receptor accessory protein)); VEGF trap (Ig domains of VEGFR1 fused to IgG1 Fc); Zenapax® (daclizumab); Zenapax® (daclizumab, anti-IL-2Ra mAb); Zevalin® (ibritumomab tiuxetan); Zetia® (ezetimibe); Orencia® (atacicept, TACI-Ig); anti-CD80 monoclonal antibody (galiximab); anti-CD23 mAb (lumiliximab); BR2-Fc (huBR3/huFc fusion protein, soluble BAFF antagonist); CNTO 148 (golimumab, anti-TNFα mAb); HGS-ETR1 (mapatumumab; human anti-TRAIL Receptor-1 mAb); HuMax-CD20 (ocrelizumab, anti-CD20 human mAb); HuMax-EGFR (zalutumumab); M200 (volociximab, anti-α5γ1 integrin mAb); MDX-010 (ipilimumab, anti-CTLA-4 mAb and VEGFR-1 (IMC-18F1); anti-BR3 mAb; anti-*C. difficile* Toxin A and Toxin B C mAbs MDX-066 (CDA-1) and MDX-1388); anti-CD22 dsFv-PE38 conjugates (CAT-3888 and CAT-8015); anti-CD25 mAb (HuMax-TAC); anti-CD3 mAb (NI-0401); adecatumumab; anti-CD30 mAb (MDX-060); MDX-1333 (anti-IFNAR); anti-CD38 mAb (HuMax CD38); anti-CD40L mAb; anti-Cripto mAb; anti-CTGF Idiopathic Pulmonary Fibrosis Phase I Fibrogen (FG-3019); anti-CTLA4 mAb; anti-eotaxin1 mAb (CAT-213); anti-FGF8 mAb; anti-ganglioside GD2 mAb; anti-ganglioside GM2 mAb; anti-GDF-8 human mAb (MYO-029); anti-GM-CSF Receptor mAb (CAM-3001); anti-HepC mAb (HuMax HepC); anti-IFNα mAb (MEDI-545, MDX-1103); anti-IGF1R mAb; anti-IGF-1R mAb (HuMax-Inflam); anti-IL12 mAb (ABT-874); anti-IL12/IL23 mAb (CNTO 1275); anti-IL13 mAb (CAT-354); anti-IL2Ra mAb (HuMax-TAC); anti-IL5 Receptor mAb; anti-integrin receptors mAb (MDX-018, CNTO 95); anti-IP10 Ulcerative Colitis mAb (MDX-1100); anti-LLY antibody; BMS-66513; anti-Mannose Receptor/hCG8 mAb (MDX-1307); anti-mesothelin dsFv-PE38 conjugate (CAT-5001); anti-PD1mAb (MDX-1106 (ONO-4538)); anti-PDGFRα antibody (IMC-3G3); anti-TGFβ mAb (GC-1008); anti-TRAIL Receptor-2 human mAb (HGS-ETR2); anti-TWEAK mAb; anti-VEGFR/Flt-1 mAb; anti-ZP3 mAb (HuMax-ZP3); NVS Antibody #1; and NVS Antibody #2.

Also included can be a sclerostin antibody, such as but not limited to romosozumab, blosozumab, or BPS 804 (Novartis). Further included can be therapeutics such as rilotumumab, bixalomer, trebananib, ganitumab, conatumumab, motesanib diphosphate, brodalumab, vidupiprant, panitumumab, denosumab, NPLATE, PROLIA, VECTIBIX or XGEVA. Additionally, included in the device can be a monoclonal antibody (IgG) that binds human Proprotein Convertase Subtilisin/Kexin Type 9 (PCSK9). Such PCSK9 specific antibodies include, but are not limited to, Repatha® (evolocumab) and Praluent® (alirocumab), as well as molecules, variants, analogs or derivatives thereof as disclosed in the following patents or patent applications, each of which is herein incorporated by reference in its entirety for all purposes: U.S. Pat. No. 8,030,547, U.S. Publication No. 2013/0064825, WO2008/057457, WO2008/057458, WO2008/057459, WO2008/063382, WO2008/133647, WO2009/100297, WO2009/100318, WO2011/037791, WO2011/053759, WO2011/053783, WO2008/125623, WO2011/072263, WO2009/055783, WO2012/0544438, WO2010/029513, WO2011/111007, WO2010/077854, WO2012/088313, WO2012/101251, WO2012/101252, WO2012/101253, WO2012/109530, and WO2001/031007.

Also included can be talimogene laherparepvec or another oncolytic HSV for the treatment of melanoma or other cancers. Examples of oncolytic HSV include, but are not limited to talimogene laherparepvec (U.S. Pat. Nos. 7,223, 593 and 7,537,924); OncoVEXGALV/CD (U.S. Pat. No. 7,981,669); OrienX010 (Lei et al. (2013), World J. Gastroenterol., 19:5138-5143); G207, 1716; NV1020; NV12023; NV1034 and NV1042 (Vargehes et al. (2002), Cancer Gene Ther., 9(12):967-978).

Also included are TIMPs. TIMPs are endogenous tissue inhibitors of metalloproteinases (TIMPs) and are important in many natural processes. TIMP-3 is expressed by various cells or and is present in the extracellular matrix; it inhibits all the major cartilage-degrading metalloproteases, and may play a role in role in many degradative diseases of connective tissue, including rheumatoid arthritis and osteoarthritis, as well as in cancer and cardiovascular conditions. The amino acid sequence of TIMP-3, and the nucleic acid sequence of a DNA that encodes TIMP-3, are disclosed in U.S. Pat. No. 6,562,596, issued May 13, 2003, the disclosure of which is incorporated by reference herein. Description of TIMP mutations can be found in U.S. Publication No. 2014/0274874 and PCT Publication No. WO 2014/152012.

Also included are antagonistic antibodies for human calcitonin gene-related peptide (CGRP) receptor and bispecific antibody molecule that target the CGRP receptor and other headache targets. Further information concerning these molecules can be found in PCT Application No. WO 2010/075238.

Additionally, bispecific T cell engager (BITE®) antibodies, e.g. BLINCYTO® (blinatumomab), can be used in the device. Alternatively, included can be an APJ large molecule agonist e.g., apelin or analogues thereof in the device. Information relating to such molecules can be found in PCT Publication No. WO 2014/099984.

In certain embodiments, the medicament comprises a therapeutically effective amount of an anti-thymic stromal lymphopoietin (TSLP) or TSLP receptor antibody. Examples of anti-TSLP antibodies that may be used in such embodiments include, but are not limited to, those described in U.S. Pat. Nos. 7,982,016, and 8,232,372, and U.S. Publication No. 2009/0186022. Examples of anti-TSLP receptor antibodies include, but are not limited to, those described in U.S. Pat. No. 8,101,182. In particularly preferred embodiments, the medicament comprises a therapeutically effective amount of the anti-TSLP antibody designated as A5 within U.S. Pat. No. 7,982,016.

Although the drug delivery devices, methods, and components thereof, have been described in terms of exemplary embodiments, they are not limited thereto. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent that would still fall within the scope of the claims defining the invention. For example, components described herein with reference to certain kinds of drug delivery devices, such as on-body injector drug delivery devices or other kinds of drug delivery devices, can also be utilized in other kinds of drug delivery devices, such as autoinjector drug delivery devices.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A drug delivery device comprising:
a primary container assembly including a reservoir, a plunger stopper disposed within the reservoir, and a drug delivery member fluidly coupled to the reservoir by a flow path;
a motor operably configured to insert the drug delivery member to a subcutaneous location and partially retract the drug delivery member;
a drug dispensing assembly including a plunger rod and a drive operably coupled to the plunger rod to drive the plunger stopper through the reservoir with the plunger rod in a drug dispensing operation;
a force sensor coupled to the drug dispensing assembly and configured to measure force data associated with dispensing a drug from the reservoir through the drug delivery member to an injection cavity at the subcutaneous location, the force data corresponding to a force required to drive the plunger stopper during the drug dispensing operation; and
a controller in communication with the force sensor and the motor, the controller configured to operate the motor to partially retract the drug delivery member a distance in response to determining that the force data indicates the force is greater than or equal to a predetermined threshold, the controller configured to estimate a tissue resistive pressure based on the force data and determine the distance for retraction of the drug delivery member based on the tissue resistive pressure.

2. The drug delivery device of claim 1, wherein the force sensor is disposed between the plunger rod and the plunger stopper.

3. The drug delivery device of claim 1, wherein the controller is configured to continuously monitor the force data and control the motor according to the force data to control an onset, rate, and extent of the retraction of the drug delivery member to maintain a desired tissue resistive pressure in the injection cavity.

4. The drug delivery device of claim 3, wherein the controller is in communication with the drive of the drug dispensing assembly and configured to control operation of the drive and the motor to maintain a desired drug dispensing force.

5. The drug delivery device of claim 1, wherein the motor is operably coupled with the drive of the drug dispensing assembly.

6. The drug delivery device of claim 1, further comprising a trocar and wherein the drug delivery member includes a cannula coaxial with the trocar and fluidly coupled to the reservoir by the flow path, wherein components of the primary container assembly and the drug dispensing assembly are disposed in a generally horizontal plane and the trocar and the cannula extend along an axis generally perpendicular to the horizontal plane; the motor is operably coupled to the cannula to insert the cannula to the subcutaneous location; and the controller is configured to operate the motor to partially retract the cannula in response to determining that the force data indicates the force greater than or equal to the predetermined threshold.

7. The drug delivery device of claim 6, further comprising a coupler connected between the motor and the cannula and configured to convert rotational motion of the motor to linear translation of the cannula.

8. The drug delivery device of claim 6, wherein the controller is configured to at least one of (a) or (b):
(a) continuously monitor the force data and control the motor according to the force data to control an onset, rate, and extent of retraction of the cannula to maintain a desired tissue resistive pressure in the injection cavity, or
(b) operate the motor to fully retract the trocar and partially retract the cannula after inserting the cannula and the trocar to the subcutaneous location.

9. The drug delivery device of claim 1, wherein components of the primary container assembly and the drug dispensing assembly are disposed along a longitudinal axis; the flow path comprises a hub rigidly coupling the drug delivery member to the reservoir.

10. The drug delivery device of claim 1, wherein the controller is further configured to operate the motor to partially retract the drug delivery member after inserting the drug delivery member to the subcutaneous location.

11. A method for operating a drug delivery device having a primary container assembly including a reservoir, a plunger stopper disposed within the reservoir, and a drug delivery member fluidly coupled to the reservoir by a flow path and a drug dispensing assembly including a plunger rod and a drive operably coupled to the plunger rod, the method comprising:
operating a motor with a controller to insert the drug delivery member to a subcutaneous location;
operating the drive with the controller to drive the plunger stopper through the reservoir with the plunger rod;
measuring force data associated with dispensing a drug from the reservoir through the drug delivery member to an injection cavity at the subcutaneous location with a force sensor coupled to the drug dispensing assembly, the force data corresponding to a force required to drive the plunger stopper during a drug dispensing operation;
determining with the controller whether the force data indicates the force is greater than or equal to a predetermined threshold;
estimating with the controller a tissue resistive pressure based on the force data and determining a distance for retraction of the drug delivery member based on the tissue resistive pressure; and
operating the motor with the controller to partially retract the drug delivery member the distance in response to determining that the force data indicates the force is greater than or equal to the predetermined threshold.

12. The method of claim 11, wherein measuring the force data comprises measuring the force data with the force sensor disposed between the plunger rod and the plunger stopper.

13. The method of claim 12, wherein determining whether the force data indicates the force greater than or equal to the predetermined threshold and operating the motor with the controller to partially retract the drug delivery member comprises:
continuously monitoring the force data with the controller; and
controlling the motor with the controller based on the force data to control an onset, rate, and extent of retraction of the drug delivery member to maintain a desired tissue resistive pressure in the injection cavity.

14. The method of claim 11, wherein operating the drive to drive the plunger stopper through the reservoir with the plunger rod comprises operating the motor.

15. The method of claim 11, wherein the drug delivery member includes a cannula, and wherein operating the motor to insert the drug delivery member to the subcutaneous location comprises operating the motor to simultaneously insert the cannula disposed coaxially over a trocar to the subcutaneous location; and operating the motor to partially retract the drug delivery member comprises operating the motor to partially retract the cannula in response to determining that the force data indicates the force greater than or equal to the predetermined threshold, and further comprising operating the motor with the controller to fully retract the trocar and partially retract the cannula after inserting the cannula and the trocar to the subcutaneous location.

16. The method of claim 11, wherein the flow path comprises a hub rigidly coupling the drug delivery member to the reservoir; and operating the motor to insert the drug delivery member to the subcutaneous location comprises operating the motor to drive the reservoir to insert the drug delivery member to the subcutaneous location.

17. The method of claim 11, further comprising operating the motor with the controller to partially retract the drug delivery member after inserting the drug delivery member to the subcutaneous location.

18. A drug delivery device comprising:
a housing having an interior;
a primary container assembly at least partially received within the interior of the housing, the primary container assembly including a reservoir having a sidewall defining an interior, a plunger stopper disposed within the interior of the reservoir, and a drug delivery member fluidly coupled to the reservoir by a flow path, at least the drug delivery member of the primary container assembly being movable from a stored position to an inserted position in a subcutaneous location;
a drug dispensing assembly including a plunger rod and a dispensing drive operably coupled to the plunger rod;
a force sensor coupled to the drug dispensing assembly to collect force data, the force data corresponding to a force required to drive the plunger stopper during a drug dispensing operation;
a drive operably coupled to the drug delivery member; and
a controller in communication with the dispensing drive and the drive, the controller configured to estimate a tissue resistive pressure based on the force data and determine a distance for retraction of the drug delivery member based on the tissue resistive pressure, the controller further configured to, after the drug delivery member has been inserted to the subcutaneous location:
operate the dispensing drive to drive the plunger stopper through the reservoir with the plunger rod; and
operate the drive to partially retract the drug delivery member the distance from the inserted position to a partially retracted position in response to an event,
wherein the event occurs when the force required to drive the plunger stopper during the drug dispensing operation is greater than or equal to a predetermined threshold.

19. The drug delivery device of claim 18, wherein the controller configured to operate the drive to partially retract the drug delivery member from the inserted position to the partially retracted position in response to the event comprises the controller configured to operate the drive to partially retract the drug delivery member from the inserted position to the partially retracted position after a predetermined delay time has passed after at least one of: (a) reception of a user input actuation signal, (b) operation of the insertion drive to insert the drug delivery member to the subcutaneous location, or (c) at a start of operation of the dispensing drive to drive the plunger stopper through the reservoir with the plunger rod.

20. The drug delivery device of claim 18, wherein the controller configured to operate the drive to partially retract the drug delivery member from the inserted position to the partially retracted position in response to the event comprises the controller configured to operate the drive to partially retract the drug delivery member from the inserted position to the partially retracted position in response to a signal from an actuator, the force sensor, or a second sensor.

* * * * *